United States Patent [19]
Duba et al.

[11] Patent Number: 6,008,971
[45] Date of Patent: Dec. 28, 1999

[54] FAULT PROTECTION ARRANGEMENT FOR ELECTRIC POWER DISTRIBUTION SYSTEMS

[75] Inventors: Greg Duba, Stonington, Conn.; Edgar S. Thaxton, Bradford, R.I.; John Walter, Niantic, Conn.

[73] Assignee: Electric Boat Corporation, Groton, Conn.

[21] Appl. No.: 09/046,078

[22] Filed: Mar. 23, 1998

[51] Int. Cl.⁶ .................................................. H02H 3/00
[52] U.S. Cl. .............................. 361/64; 361/68; 361/71; 361/75
[58] Field of Search ..................... 361/62–75; 307/85–86

[56] References Cited

U.S. PATENT DOCUMENTS

| | | |
|---|---|---|
| 2,879,453 | 3/1959 | Hodges et al. . |
| 3,529,292 | 9/1970 | Neill et al. . |
| 3,970,898 | 7/1976 | Baumann et al. . |
| 4,206,443 | 6/1980 | Britton . |
| 5,303,112 | 4/1994 | Zulaski et al. . |
| 5,341,268 | 8/1994 | Ishiguro et al. ........................... 361/62 |
| 5,412,528 | 5/1995 | Mader et al. . |
| 5,475,558 | 12/1995 | Bajonnet et al. . |
| 5,488,532 | 1/1996 | Mrowiec et al. . |
| 5,517,423 | 5/1996 | Pomatto . |
| 5,576,700 | 11/1996 | Davis et al. . |
| 5,579,195 | 11/1996 | Nishijima et al. . |
| 5,754,382 | 5/1998 | Aoyama et al. ........................... 361/62 |

Primary Examiner—Jeffrey Gaffin
Assistant Examiner—Michael J. Sherry
Attorney, Agent, or Firm—Baker & Botts, LLP

[57] ABSTRACT

A fault protection arrangement for electric power distribution systems includes a plurality of power sources connected to a distribution bus through circuit breakers and a plurality of loads connected through switches to the distribution bus, along with fault sensors in each of the power source lines and load lines and a control means responsive to detection of a fault in a load line to open the circuit breakers in the power source lines connected to the distribution bus and then to open the switch in the load line containing the fault and then to reclose the circuit breakers in the power source line to resume power flow to unaffected loads. The embodiments provide automatic fault isolation and automatic system realignments using a minimum amount of circuit interrupting devices in conjunction with a distributed control system. The embodiments eliminate fault coordination difficulties and improve power continuity as compared to conventional hierarchal protective schemes.

12 Claims, 6 Drawing Sheets

FAULT PROTECTION ARRANGEMENT FOR ELECTRIC POWER DISTRIBUTION SYSTEMS

BACKGROUND OF THE INVENTION

This invention relates to fault protection arrangements for electric power distribution systems.

The protection of personnel and electric system components, such as generators, motors, cables and power conversion equipment from short circuit conditions and other system anomalies is essential for safe and reliable distribution of electric power. Power continuity may also be critical for vital loads within a system. Heretofore, hierarchical protective arrangements using mechanical circuit breakers and fuses have been designed to utilize downstream protective devices which open first in order to clear a fault in a downstream circuit segment. In such systems the response times are slow and many protective devices are required. Moreover, time coordination of protective devices is necessary and, where fuses are used, blown fuses must be replaced before the system is completely restored.

SUMMARY OF THE INVENTION

Accordingly it is an object of the present invention to provide a fault protection arrangement for electric power distribution systems which overcomes the disadvantages of the prior art.

Another object of the invention is to provide a fault protection arrangement for power distribution systems which provides automatic fault isolation and automatic system realignment more rapidly and with fewer components than prior art systems.

These and other objects of the invention are attained by providing a fault protection arrangement in which a plurality of power source lines are connected to supply power to a plurality of load circuits in which each power source has a dedicated circuit breaker, sensor and fault controller and each load circuit has a dedicated fault controller and fault sensor and a line switching device without any energy dissipation or absorption components.

In accordance with the invention, detection of a fault by a load line fault controller produces a load fault controller command to the fault controller for each power source supplying power to the related load to open the associated circuit breakers, after which the faulted load circuit is isolated by opening the relevant load circuit dedicated switch and thereafter the power source circuit breakers are directed to close. If multiple buses connected to each other through bus cross ties are supplied from separate power sources, the connections between the buses are likewise opened, permitting power sources connected to the unaffected buses to remain in service.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
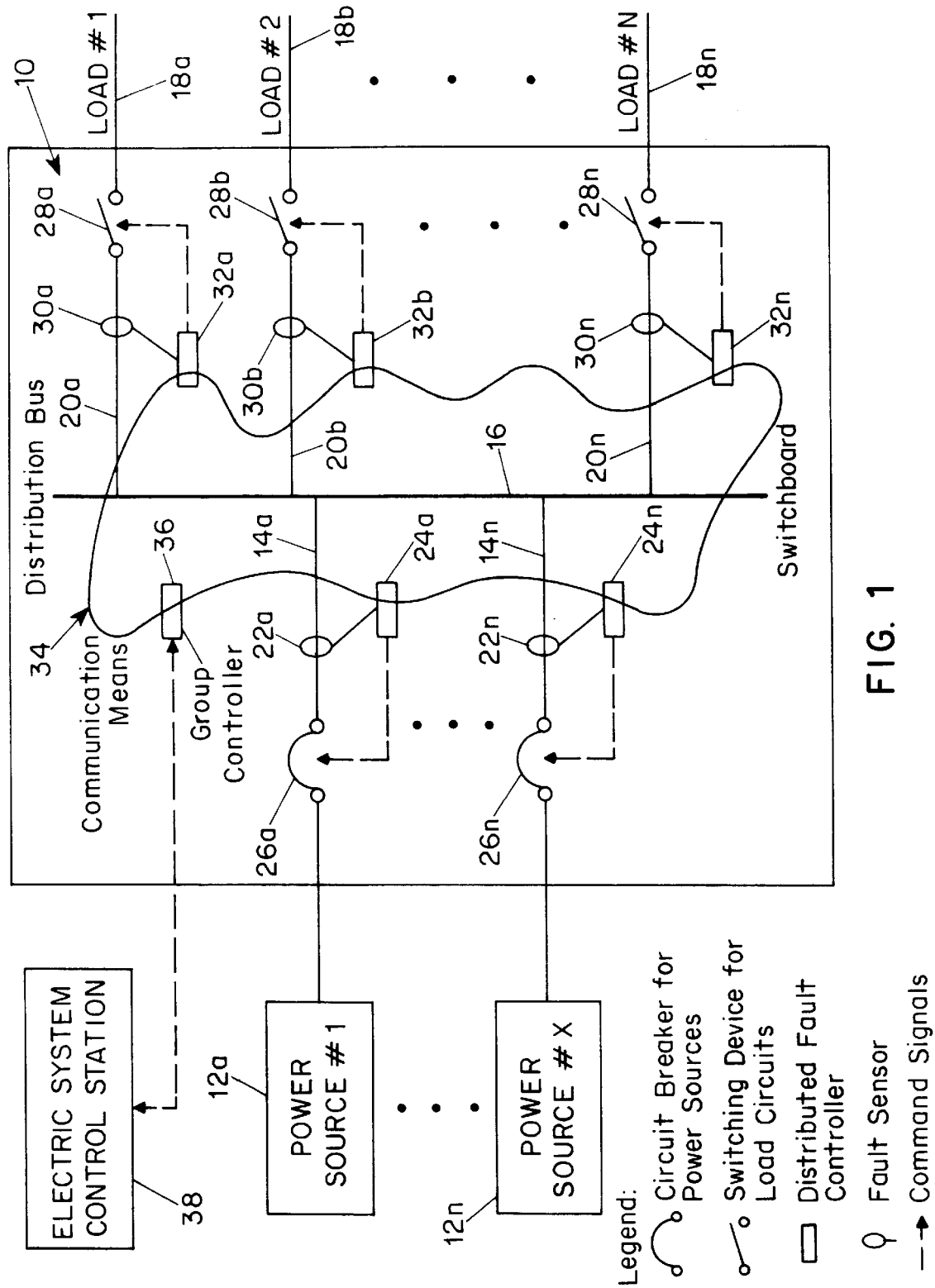
FIG. 1 is a schematic circuit diagram illustrating the arrangement of a representative embodiment of an electric power distribution system arranged in accordance with the invention.

In the typical embodiment of the invention shown in FIG. 1, a control system 10 includes a plurality of power sources 12a, 12b . . . 12n supplying power through power source lines 14a, 14b . . . 14n to a bus 16 and a plurality of loads 18a, . . . 18n receiving power from the bus 16 through corresponding load power circuits 20a, 20b . . . 20n. Each of the power source lines 14a, 14b . . . 14n has a fault sensor 22a, 22b . . . 22n of a conventional type arranged to transmit a signal to a corresponding fault controller 24a, 24b . . . 24n in response to sensing of a fault such as a short circuit in the corresponding power line. Circuit breakers 26a, 26b . . . 26n are included in each of the power source lines 14a, 14b . . . 14n and respond to signals from the corresponding fault controllers 24a, 24b . . . 24n to open the circuit between the corresponding power source and the bus 16. Preferably each of the circuit breakers 26a, 26b . . . 26n is a fast acting, current limiting solid state circuit breaker to improve power continuity over the use of conventional circuit breakers.

Each of the load circuits 20a, 20b . . . 20n, on other hand, includes a simple switching device 28a, . . . 28n without any energy dissipation or storage device of the type required when interrupting a current carrying circuit. This permits the load circuit switching devices 28a, 28b . . . 28n to be small, fast actuating and inexpensive. These switching devices are opened in response to a signal transmitted from a corresponding fault controller 32a, 32b . . . 32n.

In order to control the opening and closing of the circuit breakers 26a, 26b . . . 26n and the switches 28a, 28b . . . 28n, a communication circuit 34 is connected to each of the fault controllers 24a, 24b . . . 24n and 32a, 32b . . . 32n to transmit command signals for the operation of circuit breakers and switching devices in response to commands from the various fault controllers.

In accordance with the invention, whenever any load line fault controller 32a, 32b . . . 32n receives a fault detection signal from a fault sensor 30a, 30b . . . 30n in a load circuit 20a, 20b . . . 20n, the fault controller transmits signals through the communication circuit 34 to the controllers 24a, 24b . . . 24n for the power lines 14a, 14b . . . 14n which supply power to the bus 16 to which the load circuit having the fault is connected. Those signals cause fault controllers 24a, 24b . . . 24n to open the corresponding circuit breakers 26a, 26b . . . 26n and thereby terminate the supply of power to the group of load circuits containing the load circuit with the fault. Upon receipt of signals through the communication circuit 34 that all of the power source lines have been opened, the fault controller for the load line having the fault opens the corresponding switch under a no load condition, thereby avoiding the necessity for energy dissipation or storage arrangements. As soon as the switch 28a, 28b . . . 28n has been opened, the corresponding controller 32a, 32b . . . 32n transmits a signal through the circuit 34 to the controllers 24a, 24b . . . 24n for the power source lines 14a, 14b . . . 14n, causing them to close the corresponding circuit breakers 26a, 26b . . . 26n supplying power to the bus 16 and to the unaffected load lines 20a, 20b . . . 20n.

Figure 2:
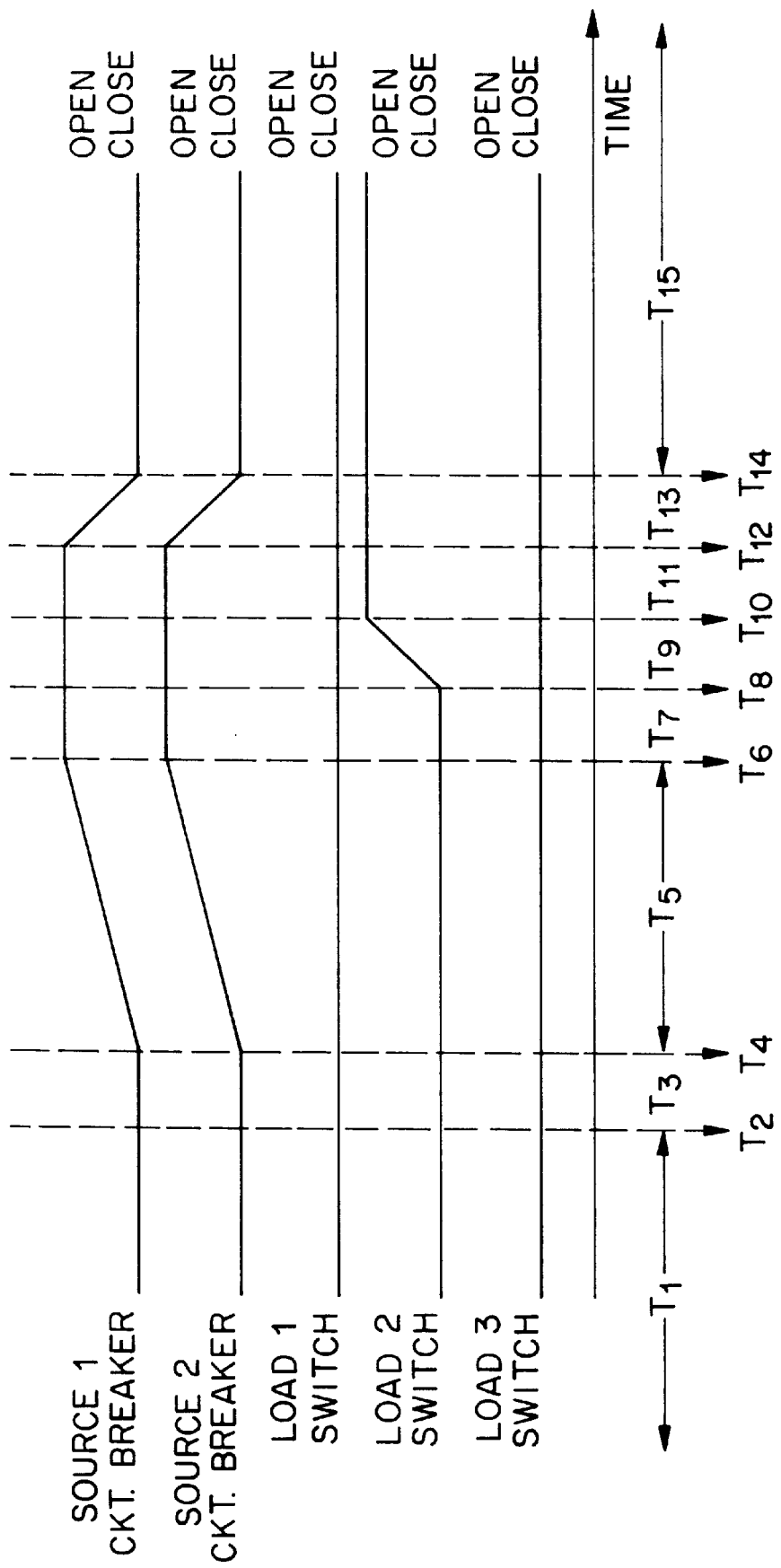
FIG. 2 is a schematic timing diagram illustrating the relation of the operating times for the various components of the system shown in FIG. 1.

FIG. 2 shows the timing of the operation of the various circuit breakers and switches in the embodiment of the type shown in FIG. 1. This example assumes that two power sources, designated source 1 and source 2, are supplying power to the bus 16 and that three loads, designated load 1, load 2 and load 3, are receiving power from the bus 16 and that the load line leading to load 2 develops a fault. In the illustrated operation sequence, the power source line and load line fault controllers detect normal signals from the fault sensors during the time period designated $T_1$ and at the time $T_2$ the load controller for the load 2 detects a fault and transmits a signal during a message transmission period $T_3$ to the power source controllers to open the corresponding circuit breakers. At the time $T_4$, the power source controllers receive the message to open the circuit breakers and command the circuit breakers to open, which takes place during a time interval $T_5$. At the time $T_6$ the power source controllers send a confirmation message to the load controller for the load 2 that the circuit breakers for the power supply circuits have been opened. These messages are transmitted during the time period $T_7$ and received at the time $T_8$ at which time the controller for load 2 commands the load 2 switch to open. Opening of the load 2 switch occurs during the time interval $T_9$, after which the load 2 controller sends a reclose message to the power source circuit breakers to reclose at a time $T_{10}$. Following a transmission time period $T_{11}$, the power source controllers receive the reclose message and command the circuit breakers to reclose at a time $T_{12}$. Closing of the circuit breakers 26 occurs during the time period $T_{13}$ and power is restored to the remaining loads 1 and 3 at the time $T_{14}$.

Except for the circuit breaker commutation period $T_5$, each of the steps described above occurs in a fraction of a millisecond. The length of the circuit breaker commutation period depends on the type of circuit breaker and the circuit characteristics and this step, which may require several milliseconds, will dominate the sequence of events. Thus, the power interruption, fault isolation and power recovery take place in essentially the time that it takes to interrupt power in the power supply lines, the time required for the other steps in the operation being negligible. Using fast acting circuit breakers for the power supply lines permits minimum power interruption as a result of a fault thereby providing improved power continuity in comparison with conventional arrangements which use a hierarchical method involving mechanical circuit breakers and fuses which are typically coordinated with intentional delays to allow downstream devices to open before upstream devices. Eliminating these delays and avoiding the use of magnetically and thermally activated devices significantly improves power continuity while reducing energy passing through during a fault. If desired, a group controller 36 connected to a manual electric system control station 38 may be included in the communication circuit 34 to permit operator control of the system and to check the status of the fault controllers.

If a power source fault controller 24a, 24b . . . 24n in one of the power lines 14a, 14b . . . 14n detects a fault which may, for example, be in the power line itself or in the distribution bus 16, that controller commands its corresponding circuit breaker 26a, 26b . . . 26n to open and interrupt the power supply through the corresponding line. Any other fault controller 24a, 24b . . . 24n in the lines 14a, 14b . . . 14n detecting its corresponding power source supplying the fault will also act to open the corresponding circuit breaker 26a, 26b . . . 26n in the same manner. In the arrangement shown in FIG. 1, however, all of the loads which receive power from the bus 16 must remain powerless until the fault in the power source line or the distribution bus has been corrected.

Figure 3:
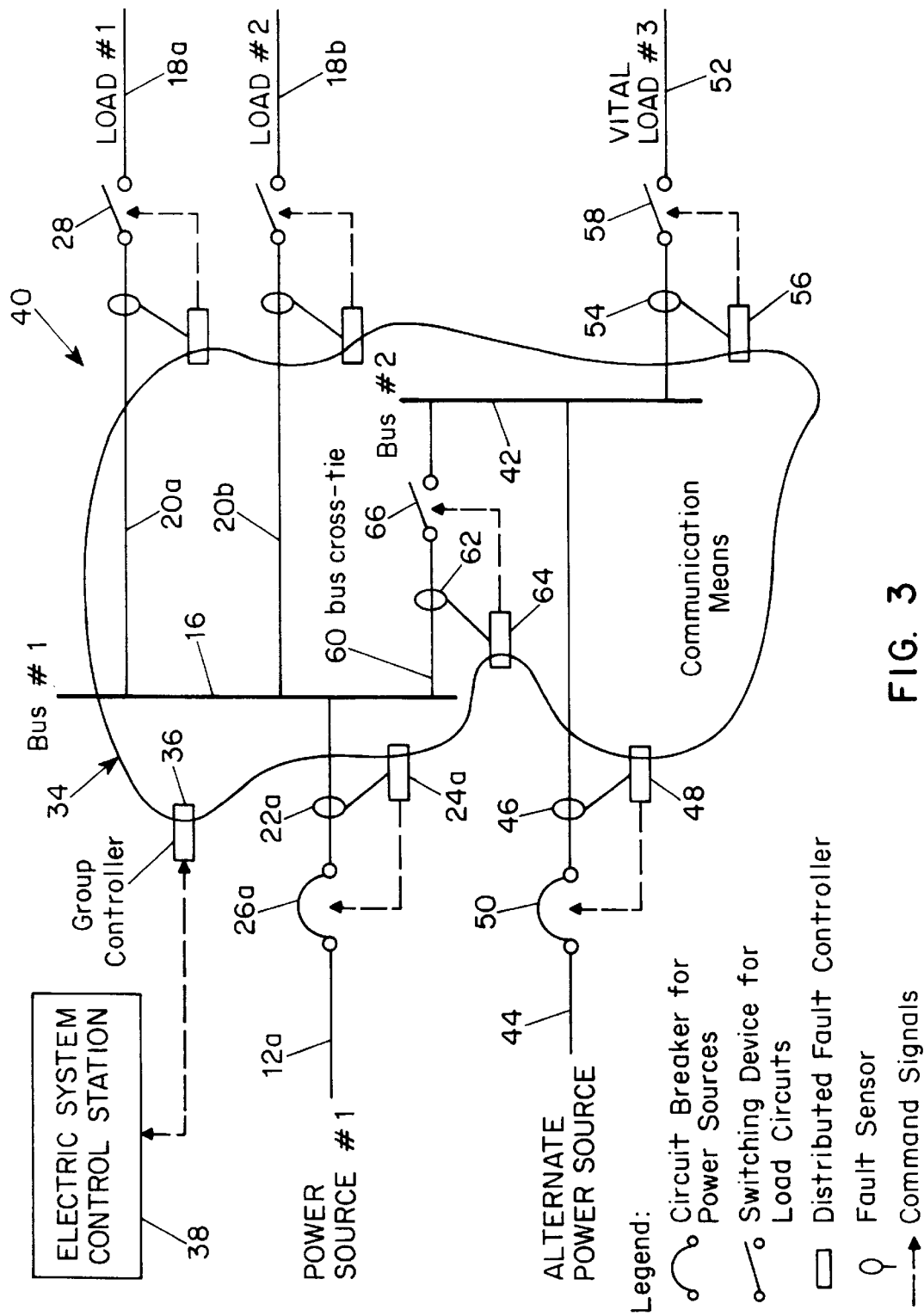
FIG. 3 is a schematic circuit diagram illustrating another representative embodiment of the invention providing an alternate power source.

In order to eliminate that problem, a multiple bus arrangement 40 of the type shown in FIG. 3 may be provided. In this arrangement a source power line 12a supplies power to the bus 16 which in tun transmits power to a plurality of loads 18a, 18b in the same manner described above. In addition, however, a second bus 42 receives power from the distribution bus 16 through a bus cross tie 60. An alternate power source is connected to bus 42 through a line 44 having a fault sensor 46, a fault controller 48 and a circuit breaker 50 of the same type included in the line 12a. If the distribution bus 42 is powered from distribution bus 16 through bus cross tie 60, then circuit breaker 50 can be in the open state. A vital load, for which continuous supply of power is essential, is not connected directly to the bus 16 but receives power from the second bus 42 through a load power line 52. The line 52 has a fault sensor 54, a fault controller 56 responsive to the fault sensor, and a switch 58 which are essentially the same as the fault sensors and controllers and switches in the load lines 18a and 18b. The second bus 42 is connected to the bus 16 through a cross tie line 60 having a fault sensor 62, a fault controller 64 and a switch 66 which are also similar to the fault control arrangements of the load lines 18a and 18b.

In normal operation, the power source line 12a supplies power to the buses 16 and 42 which are connected together through the cross tie 60. In the event of a fault in the bus 16 or the power source line 12a, the circuit breaker for the power source line 12a is opened by the corresponding fault controller 24a in the manner described above and, upon receipt of confirmation signals through the communication circuit 34 that all of the circuit breakers are open, the controller 64 causes the switch 66 in the bus cross tie line 60 to open. When the controller 48 receives a confirmation signal through the communication circuit 34 from fault controller 64 that the switch 66 has been opened, it causes the circuit breaker 50 to close thereby restoring power to the bus 42 and to the vital load.

Figure 4:
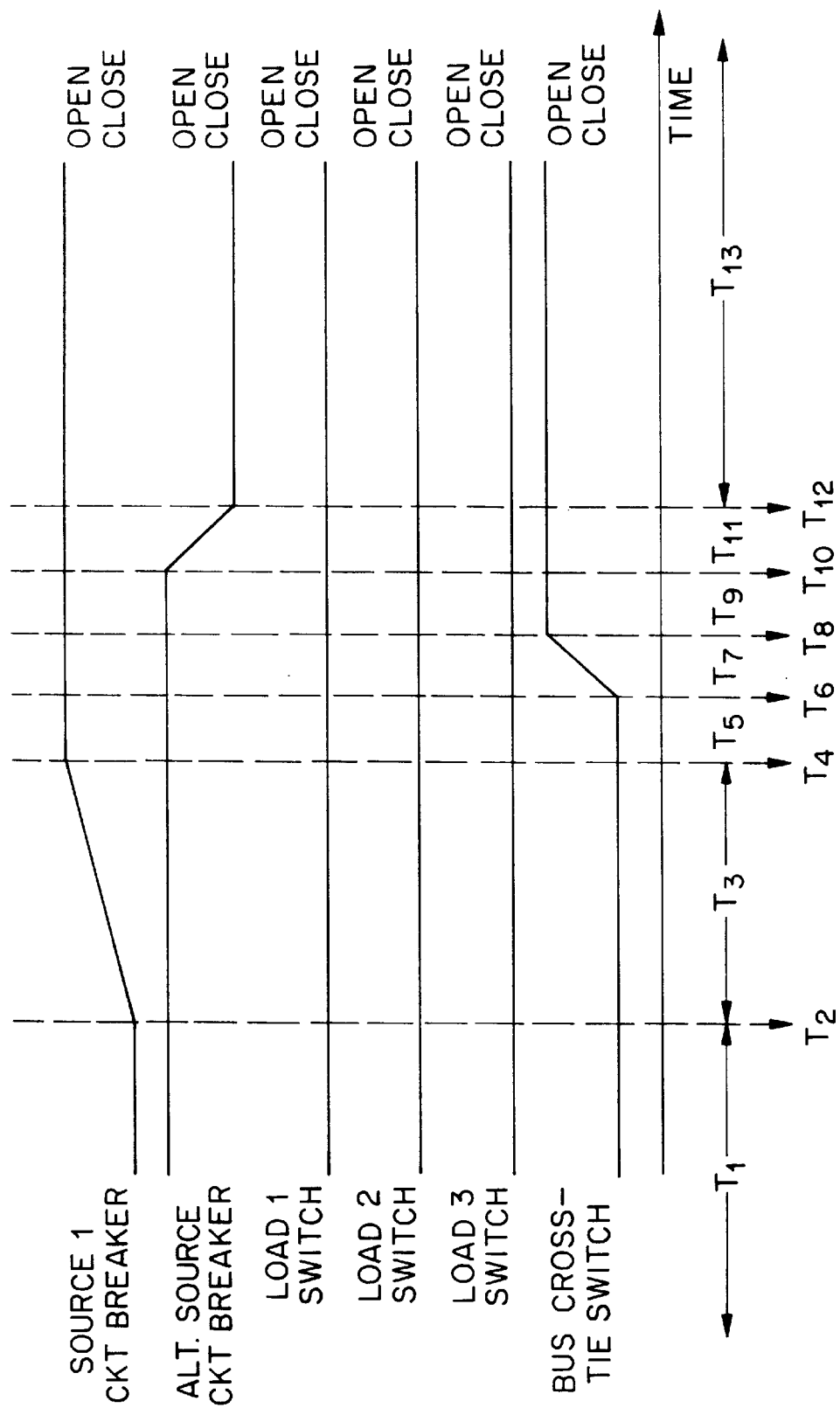
FIG. 4 is a schematic timing diagram illustrating the relation of the operating times of the various components shown in FIG. 3.

FIG. 4 illustrates the time sequence of the events involved in the operation of the arrangement shown in FIG. 3. During the time period $T_1$ all of the fault controllers detect normal signals from the fault sensors. At the time $T_2$, the controller 24a for the power source line 12a detects a fault and commands the circuit breaker 26a to open, which occurs during the time period $T_3$. At the time $T_4$, the controllers 24a and 48 send open confirmation signals to the controller 64 which occurs during time period $T_5$. At time period $T_6$, controller 64 commands the cross tie switch 66 to open. Opening of the cross tie switch takes place during the time $T_7$ and when the cross tie switch is open at $T_8$, the controller 64 sends an open confirmation signal to the alternate power source controller 48 during a message transmission period $T_9$. At the time $T_{10}$, the alternate source controller 48 commands its circuit breaker 50 to close, which occurs during the time period $T_{11}$, so that at the time $T_{12}$, power has been restored to the vital load.

In the arrangement shown in FIG. 3, if the primary power source supplying power through the line 12a fails or is taken out of service for some reason, the fault controllers perform an automatic realignment of the system to supply the loads on the lines 18a, 18b and 52 from the alternate power source. For this purpose, when the sensor 22a in the line 12a detects a loss of power, the corresponding controller 24a commands the circuit breaker 26a to open and sends a close message to the alternate power source controller 48. The alternate power source controller then closes its circuit breaker to restore power to the loads.

The arrangement of the fault controller communication circuit 34 in FIGS. 1 and 3 as a ring circuit may, if desired, be replaced by a point to point, star, or any other circuit configuration which permits each controller to detect signals from all of the controllers and to supply signals to all of the controllers. If desired, the fault controllers may also be arranged to keep a historical log of fault locations and electrical system protective device status for maintenance and trouble shooting purposes. The group controller 36 and electrical system control station 38 shown in FIGS. 1 and 3 permit operator control of the electric power distribution system so that an operator at the central control station may receive fault indications from the various controllers and transmit appropriate fault controller commands. The group controller may also be used to check the status of the protective system and to provide the other fault controllers with new fault detection criteria or to disable automated system realignments. Moreover, the communication circuit 34 may be a physical connection, such as wire or fiber optic cable, or it may be a wireless connection. Each of the fault controllers requires a reliable power source for operation since the fault controllers must operate when the power sources have been disconnected.

Furthermore, the arrangement of the invention may be utilized with a single master fault controller rather than dedicated fault controllers for each protective device. In this case, the master fault controller is arranged to communicate with every fault sensor and every protective device. This significantly reduces the total amount of hardware needed to implement the protective system. A secondary or back-up master fault controller could also be provided for resiliency.

If desired, the communication circuit 34 connecting the various fault controllers shown in FIGS. 1 and 3 can be eliminated while retaining ability to automatically isolate faults but, without the communications system 34, automated system realignments cannot be effected. In the absence of a communication system, a load controller detecting a fault sets an internal flag to provide an open command to its switching device when its corresponding fault sensor indicates the circuit has been interrupted (i.e., denotes zero current). A power source fault controller detecting the fault commands its circuit breaker to open, then waits a short period of time and commands its circuit breaker to re-close. During that time interval the load fault controller detects the circuit interruption and commands its switching device to open. If the fault is upstream of a load, the circuit breaker recloses and the power source continues to supply the fault but the power source fault controller then again detects the fault and commands the circuit breaker to reopen. The power source fault controller then waits, realizing the fault has not been isolated, or continues to reclose and open for a predetermined number of attempts. This arrangement provides a simplified protective system while still assuring automatic fault isolation without the detriments of a conventional system taking into account the transient requirements of the system. In addition to eliminating the fault controller communication system, this arrangement does not require fault controllers to have knowledge of present and future system alignments.

Figure 5:
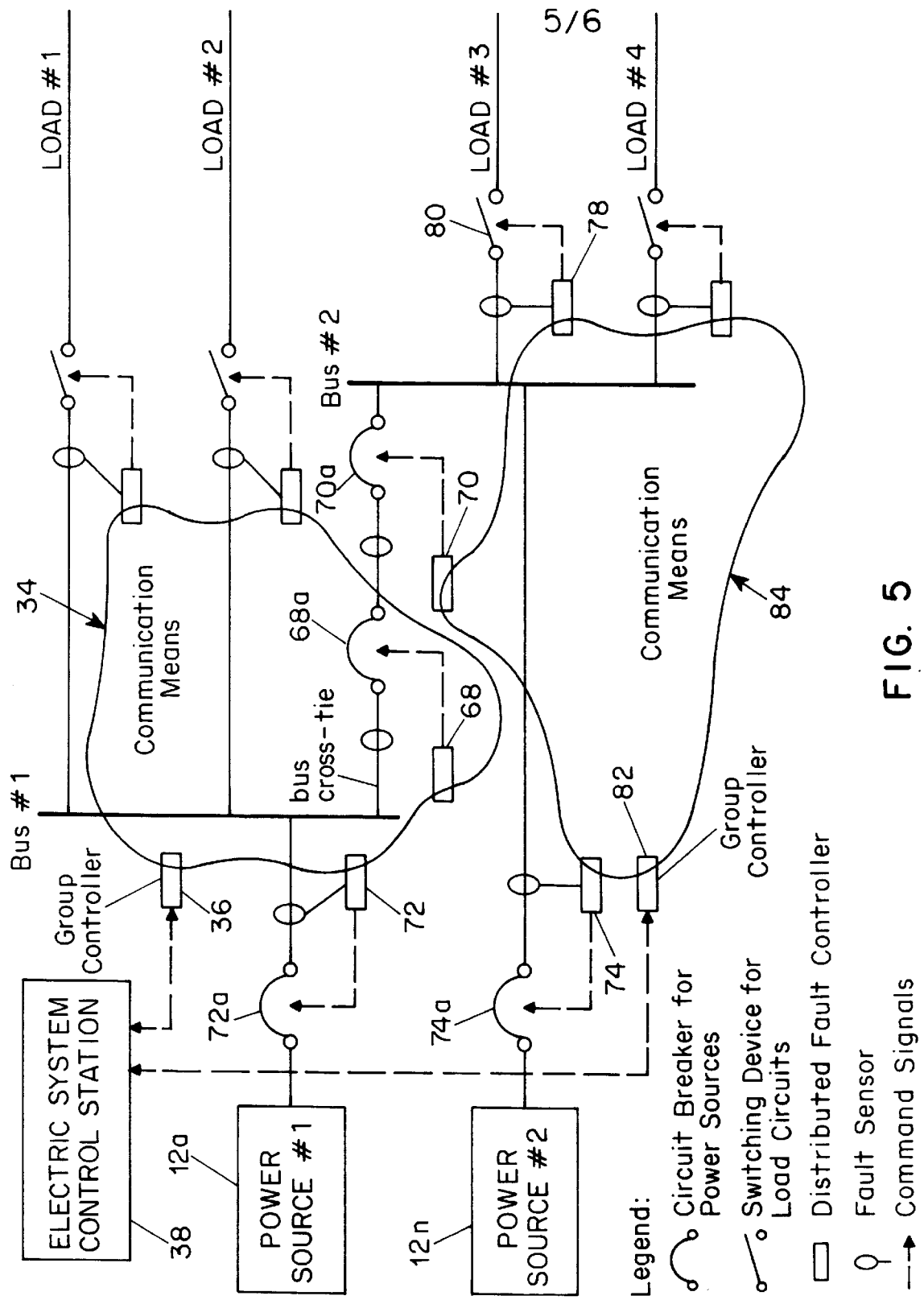
FIG. 5 is a schematic circuit diagram illustrating an alternate embodiment of the invention.

In an alternate embodiment shown in FIG. 5, the fault controller arrangement may be implemented on a distribution bus level rather than the described source level implementation. The arrangement includes Bus #1 and Bus #2 connected by a bus cross tie line as well as circuit breakers 72a and 74a and controllers 72 and 74 associated with power source #1 and power source #2 respectively, and a controller 78 and a switch 80 associated with load #3. The bus cross tie line includes a circuit breaker 68a and a controller 68 associated with Bus #1 and a circuit breaker 70a and a controller 70 associated with Bus #2. In addition, a group controller 82 controls a separate communication circuit 84 for the controllers associated with Bus #2. Such an arrangement requires more fault energy dissipation or absorption capacity since, instead of providing one circuit breaker for each power source, circuit breakers are required for every potential incoming power path to a distribution bus or group of distribution buses. Although more circuit breakers are necessary with this arrangement, the fault controllers associated with the distribution bus or group of buses do not have to communicate with fault controllers protecting another portion of the system. This provides an advantage with electric power distribution systems which are spread out over a large area or are otherwise difficult to link through a communication system.

Figure 6:
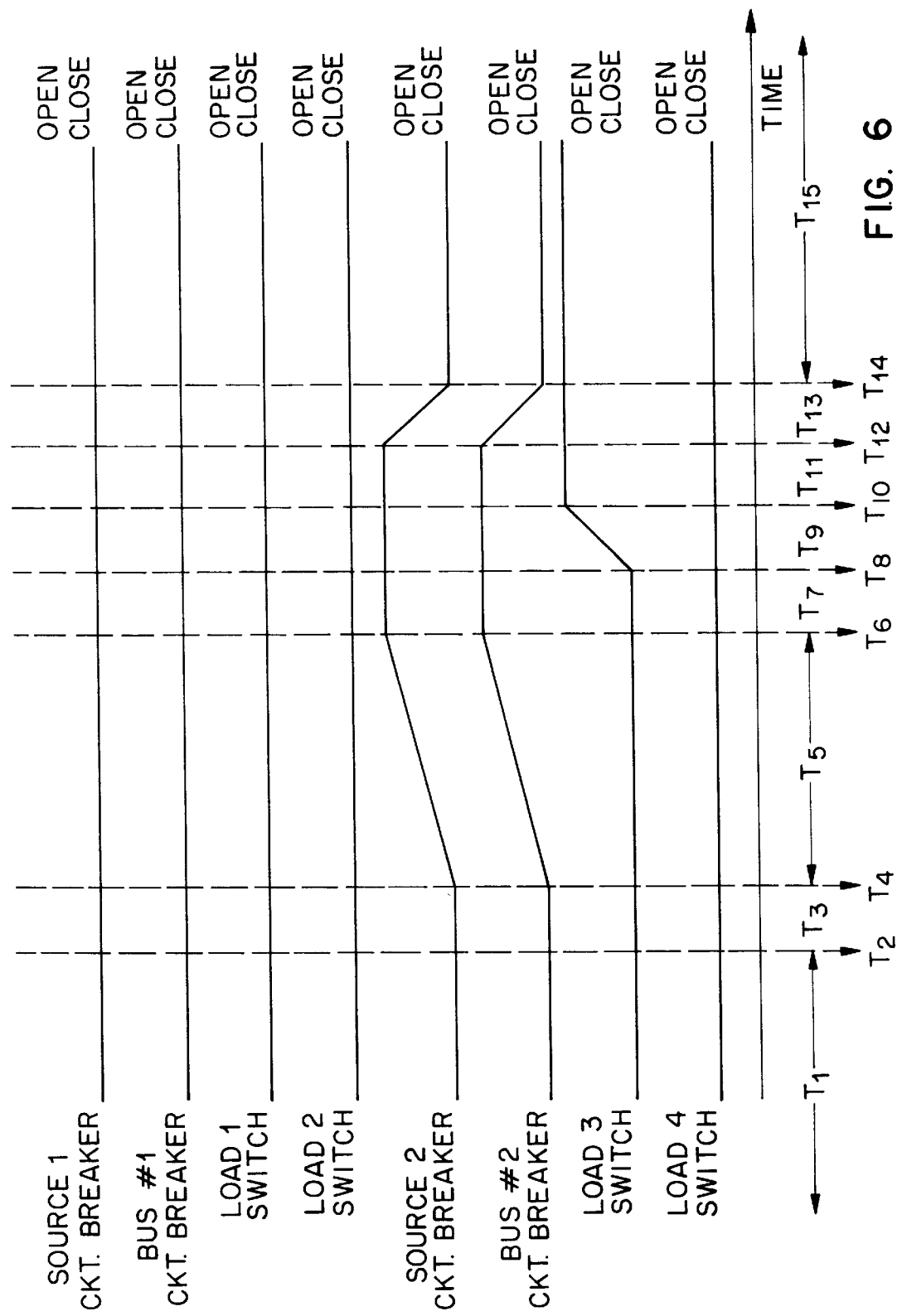
FIG. 6 is a schematic timing diagram illustrating the relation of the operating times of the various components shown in FIG. 5.

FIG. 6 illustrates the time sequence of the events involved in the operation of the arrangement shown in FIG. 5. The fault controllers detect normal signals from the fault sensors during the time period $T_1$ and at the time $T_2$, the load controller 78 for load #3 detects a fault and transmits a signal during a message transmission period $T_3$ to the power source #2 controller 74 and Bus #2 cross tie line controller 70 to open the corresponding circuit breaker 74a and bus cross tie circuit breaker 70a. At the time $T_4$, the controllers 74 and 70 receive the message to open the circuit breakers 74a and 70a and command the circuit breakers to open, which takes place during the time interval $T_5$. At the time $T_6$, the controllers 74 and 70 send an open confirmation message to the load controller 78 for load #3 that the circuit breakers for the power supply #2 and for the bus #2 cross tie line have been opened. These messages are transmitted during the time period $T_7$ and received at the time $T_8$ at which time the controller 78 for load #3 commands the load #3 switch 80 to open. Opening of the load #3 switch 80 occurs during the time interval $T_9$, after which the load #3 controller 78 sends a reclose message to power source controllers 74 and 70 to reclose the circuit breakers 74a and 70a at time $T_{10}$. Following a message transmission period $T_{11}$, controllers 74 and 70 receive the reclose message at time $T_{12}$. Closing of the circuit breakers 74a and 70a occurs during the time period $T_{13}$ and power is restored to load #4 at the time $T_{14}$. During the process, there has been no power interruption to loads #1 and #2.

Although the invention has been described herein with reference to specific embodiments, many modifications and variations therein will readily occur to those skilled in the art. Accordingly all such variations and modifications are included within the intended scope of the invention.

We claim:

1. A fault protection arrangement for an electric power distribution system comprising:

at least one power distribution bus;

at least one power source line connected to the power distribution bus;

a circuit interruption means in the power source line;

a fault sensor for the power source line;

at least two load lines connected to the distribution bus to supply power to corresponding loads;

a fault sensor for each of the load lines;

a switch without current interruption capability in each of the load lines; and control means responsive to detection of a fault to cause the power line circuit interruption means to open, then cause a switch in the faulted load line to open and then cause the power line circuit interruption means to close.

2. A fault protection arrangement according to claim 1 including a plurality of power source lines connected to the distribution bus and circuit interruption means, fault sensor and control means associated with each of the power source lines.

3. A fault protection arrangement according to claim 1 including a fault controller associated with each of the circuit interruption means and switches and a communication system providing communication among all of the fault controllers.

4. A fault protection arrangement according to claim 1 including:
   a second distribution bus;
   a cross tie line connecting the distribution bus with the second distribution bus;
   a fault sensor for the cross tie line;
   a switch without current interruption capability in the cross tie line;
   an alternate power source connected to the second distribution bus through an alternate power source line;
   a circuit interruption means in the alternate power source line;
   a fault sensor in the alternate power source line;
   a further load connected to the second distribution bus through a further load line;
   a fault sensor and a switch without current interruption capability in the further load line; and
   a distributed fault controller arrangement responsive to detection of a fault in the distribution bus or a power line connected to the distribution bus to cause the circuit interruption means to open, then the switch in the cross tie line to open and then the alternate power source line circuit interruption means to close.

5. A fault protection arrangement according to claim 1, claim 2, or claim 3 including a group controller and a manual control station for selectively monitoring and operating the circuit interruption means and switches through the group controller.

6. A fault protection arrangement according to any one of claim 1, claim 2, claim 3 or claim 4 wherein the circuit interruption means is selected from the group consisting of solid state electronic devices and electro-mechanical devices and the switch is selected from the group consisting of solid state devices and electro-mechanical devices.

7. A fault protection arrangement according to any one of claim 1, claim 2, claim 3 or claim 4 wherein the load lines do not include energy storage or dissipation means.

8. A fault protection arrangement according to claim 5 wherein the load lines do not include energy storage or dissipation means.

9. A fault protection arrangement according to claim 6 wherein the load lines do not include energy storage or dissipation means.

10. A method for fault protection in an electric power distribution system containing a distribution bus, at least one power source connected through a power source line to the distribution bus, at least two loads connected through corresponding load lines to the distribution bus; fault sensors in each of the load lines and power source lines; circuit interruption means in the power source lines, and switches without current interruption capability in the load lines comprising:
   detecting a fault by a fault sensor in a load line connected to the distribution bus;
   causing each circuit interruption means in a power source line to open;
   causing a switch without current interruption capabilities in the load line containing the fault sensor by which a fault was detected to open; and
   reclosing the circuit interruption means in the power source lines connected to the distribution bus.

11. A method according to claim 10 further comprising the steps of:
   (a) detecting the presence of said fault after reclosing the circuit interruption means;
   (b) causing the circuit interruption means to open;
   (c) waiting for a predetermined time period before reclosing the circuit interruption means; and,
   (d) repeating steps (a), (b), and (c) upon detecting said fault.

12. A method for fault protection in an electric power distribution system containing a distribution bus, at least one power source connected through a power source line to the distribution bus, at least two loads connected through corresponding load lines to the distribution bus; fault sensors for each of the load lines and power source lines; circuit interruption means in the power source lines, and switches without current interruption capability in the load lines comprising:
   detecting a fault in a load line connected to the distribution bus;
   causing each circuit interruption means in a power source line to open;
   causing a switch without current interruption capabilities in the load line in which a fault was detected to open; and
   reclosing the circuit interruption means in the power source lines connected to the distribution bus;
   wherein the distribution system includes a second distribution bus and an alternate power source connected through an alternate power source line to the second distribution bus and a further load connected through a switch without current interruption capability to the second distribution bus, and a bus cross tie line having a switch without current interruption capability and a fault sensor connecting the distribution bus and the second distribution bus comprising:
   detecting a fault in the distribution bus or an associated power source line;
   causing the circuit interruption means in the power source lines connected to the distribution bus and the circuit interruption means in the alternate power source line to open;
   opening the switch in the cross tie line connecting the distribution bus and the second distribution bus; and
   closing the circuit interruption means in the alternate power source line connected to the second distribution bus.

* * * * *

UNITED STATES PATENT AND TRADEMARK OFFICE
CERTIFICATE OF CORRECTION

PATENT NO. : 6,008,971
DATED : December 28, 1999
INVENTOR(S) : Greg Duba, et al.

It is certified that error appears in the above-identified patent and that said Letters Patent is hereby corrected as shown below:

On the title page:

Item [56] References Cited, U.S. PATENT DOCUMENTS: "5,475,558 12/1995 Bajonnet et al." should read -- 5,475,558 12/1995 Barjonnet et al. --, per IDS dated 5/26/98.

In the Abstract

"A fault protection" should read -- In the particular embodiments described in the specification, a fault protection--, per Specification page 17, line 2.

Column 4, line 6, "tun" should read -- turn --

Signed and Sealed this

Third Day of April, 2001

Attest:

NICHOLAS P. GODICI

*Attesting Officer*     Acting Director of the United States Patent and Trademark Office